Sept. 20, 1932.                R. YATES                 1,878,358
                        BLADE ROTATING MECHANISM
                        Filed May 29, 1929       2 Sheets-Sheet 1
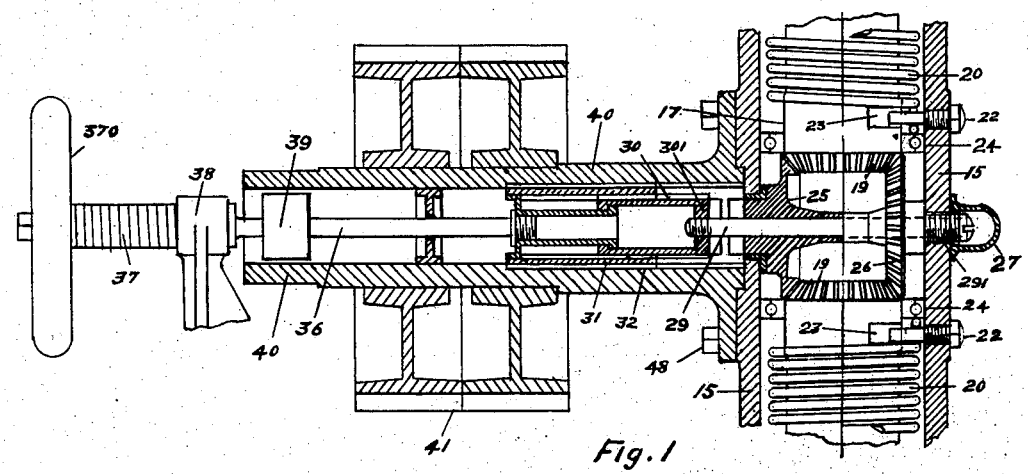
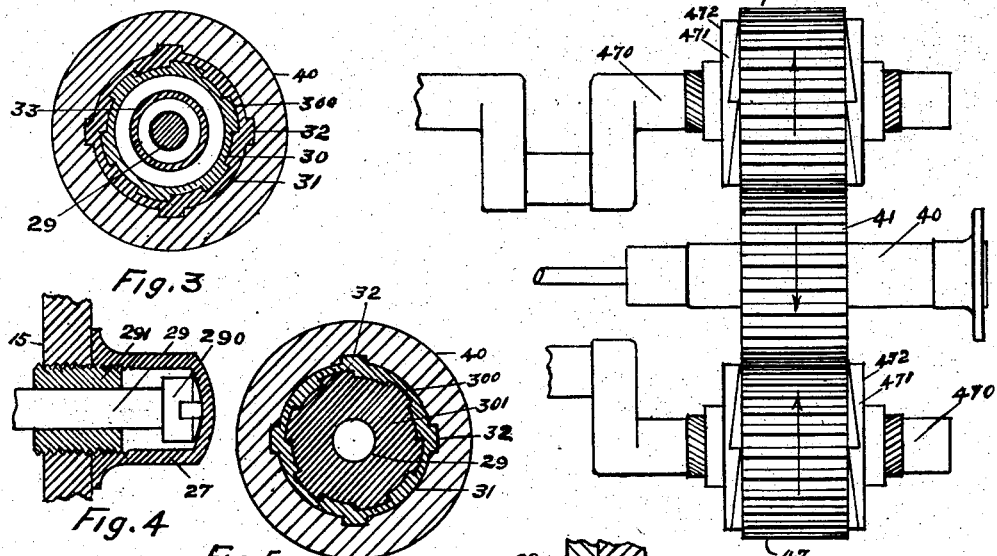
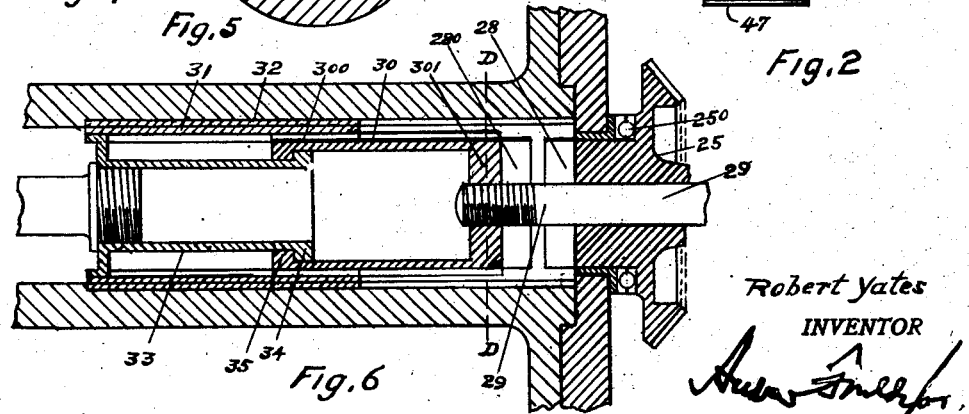

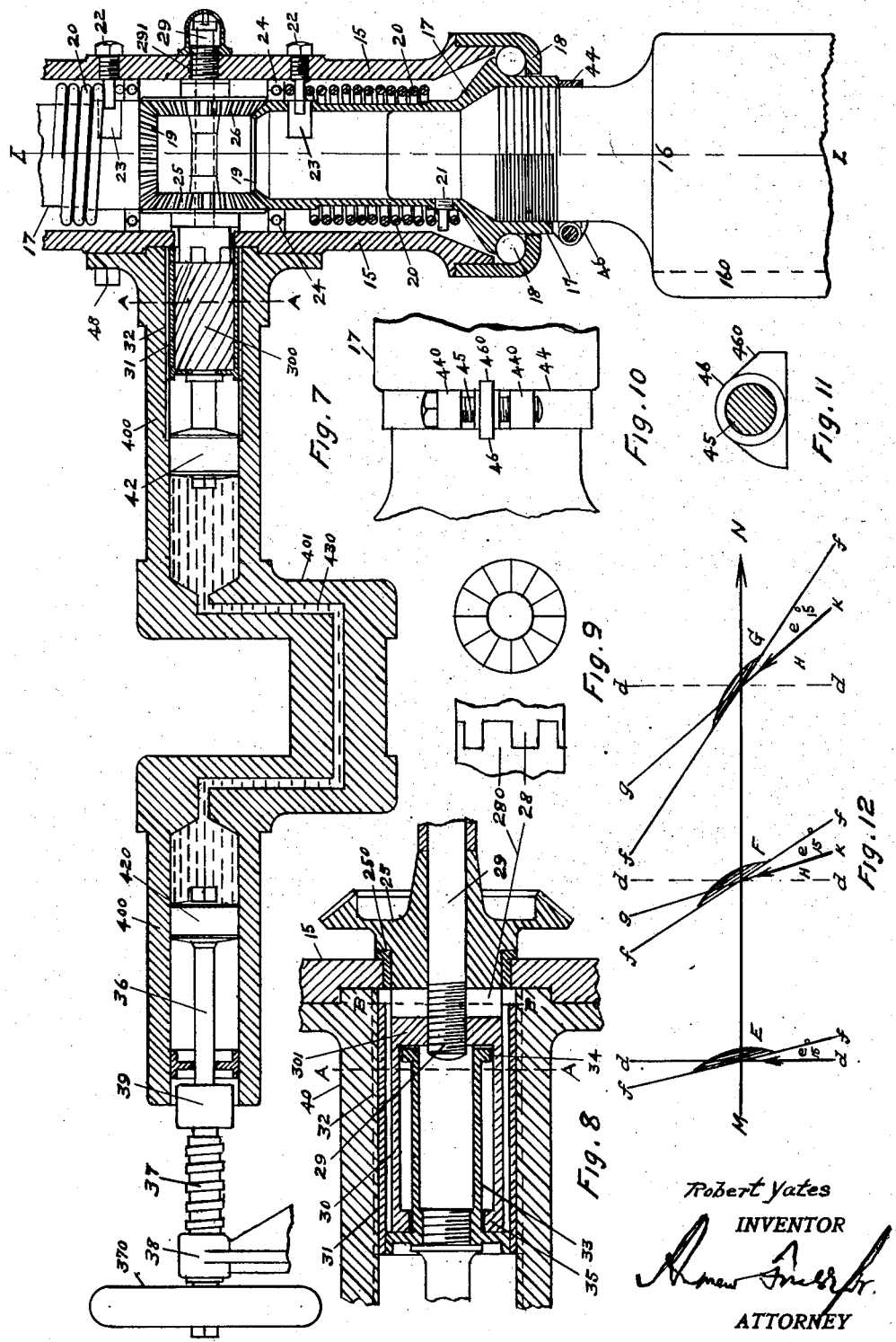

Patented Sept. 20, 1932

1,878,358

UNITED STATES PATENT OFFICE

ROBERT YATES, OF PASSAIC, NEW JERSEY, ASSIGNOR OF ONE-HALF TO EMMA HOPE YATES, OF PASSAIC, NEW JERSEY

BLADE ROTATING MECHANISM

Application filed May 29, 1929. Serial No. 366,796.

The improvements herein described are in the nature of an addition to my automatic variable pitch propeller, described in Letters Patent No. 1,250,263, issued to me December 18, 1917, and an object of this invention is to provide means whereby the pitch angle of the blades may be reduced to an acute angle, with reference to the plane of rotation, at the will of the aviator, and against the counteracting power of torsional springs.

It is well understood that the power required to rotate a propeller effectively increases or decreases with the increase or decrease of the pitch angle of the blades, and it is now fully realized that one of the greatest hazards of flying is loss of engine power in flight. It is quite possible that if the power of an engine became reduced in flight, below that required to rotate the propeller against the counteracting power of the springs, the propeller would stall the engine, and to obviate such possible emergency, the improvements herein described are particularly directed.

Referring to the drawings:

Figure 1 shows a longitudinal sectional view of a hollow propeller shaft, 40, and part of the hub, 15, of the propeller, with attachments reaching through the shaft by which the equalizing gears, 25, 26, 19, within the hub, may be operated to reduce the pitch angle of the blades, and also shows a gear wheel 41 mounted on the shaft for making connection with gears on the engine shafts.

Fig. 2 is a plan showing one method of transmitting power from a twin engine to the propeller through gears, 47 and 41, connecting the engine shafts, 470, with the propeller shaft, 40. This method of connecting the engine with the propeller admits the use of a hollow propeller shaft, open from end to end, and means for reducing the pitch angle of the blades manually through the shaft.

Fig. 3 is a cross section at A—A, on Figures 7 and 8, showing a section of the propeller shaft, 40, and operating cylinders, 30 and 31, within the shaft; and showing the longitudinal ribs, 32, on the outside of the outer cylinder, 31, fitted to slide in longitudinal grooves, 32, on the inner side of the shaft; also spiral ribs, 300, on the outside of the inner cylinder fitted to slide in corresponding spiral grooves, 300, cut on the inner side of the outer cylinder, the cylinders being telescoped together so that when the outer cylinder, 31, is moved forward or backward within the shaft the inner cylinder, 30, is caused to turn laterally, and correspondingly, in reference to the shaft.

Fig. 4 is a longitudinal section of the cap, 27, limiting the outward movement of the spindle, 29; also showing a bushing, 291, set in the hub, 15, of the propeller, against which the head, 290, of the spindle stops, to limit the inward movement of the spindle.

Fig. 5 is a cross section of the propeller shaft, 40, at D—D, on Fig. 6, showing the head, 301, of the inner cylinder, 30.

Fig. 6 is a part longitudinal section of the hollow shaft of the propeller as shown on Fig. 1, showing the operating cylinders, 30, 31, drawn out to the limit and the jaws of the coupling, 28, 280, disengaged, so that the equalizing gears, 25, 26, 19, are free to turn with the blades, 16, (Fig. 7) and the propeller to operate automatically.

Fig. 7 shows the propeller connected directly to the engine shaft, 400. This shaft is hollow at both ends and the chambers, 43, so formed, are connected through the intervening crank, 401, or cranks (one only, shown) by a small central bore, 430. There is a piston head in each end chamber, and the chambers and channels between these piston heads are filled with a suitable fluid, the piston head, 420, at the rear end of the shaft is connected to a handwheel, 370, and screw, 37, and the piston head, 42, at the forward end is connected to the outer cylinder, 31, of the operating cylinders, so that pressure put on by the handwheel screw, 37, is transmitted through the fluid, 43, to the operating cylinders, driving the outer cylinder, 31, longitudinally forward and turning the inner cylinder, 30, laterally, thus causing the equalizing gears, 25, 26, 19, and blades, 16, to turn and reduce the pitch angle accordingly, against the torsional tension of the springs, 20.

Then reversing the pressure on the piston heads by the handwheel, 370, and screw, 37;

first there is a reaction of the torsional tension of the springs, turning back the blades, 16, equalizing gears, 25, 26, 19, and the inner operating cylinder, 30, driving the outer cylinder, 31, and piston head, 42, back. This backward movement due to the reaction of the springs, 20, is then further accelerated by atmospheric pressure on the piston head, 42.

Fig. 8 is a partial longitudinal section of the shafts, 40 and 400, ribbed operating cylinders, 30—31, jaw coupling, 28—280, and principal pinion, 25, of the equalizing gear, showing the cylinders telescoped together and the jaws of the coupling, 28—280, interlocked.

Fig. 9 shows a side view of the jaw coupling, 28—280, with the jaws interlocked, and a view of the face of one half of the coupling.

Fig. 10 is a top view of the clamp collars, 44, preventing the blades, 16, from turning in the sleeves, 17; a stop, 46, having a flat base and projecting lugs is bored and tapped to receive the clamp screw, 45; one lug, 460, of the stop is shown fitted into a corresponding notch, 460, in the shoulder of the sleeve, 17, carrying the blade.

Fig. 11 is an end view of the stops, 46, on the clamp collars, 44, showing the projecting lugs.

Fig. 12 shows diagrams (E, F, G) illustrating the progressive changes of angle of blades when the plane is flying in the direction of M—N at different speeds. The line d, d, shows the line of the plane of rotation of the blade in reference to the axis of the propeller M—N, the line f, f, shows the line of the total blade angle, the line g, k, shows the line of the resultant between the force due to the speed of flight and the force due to the speed of rotation of the blade; this line g, k, also indicates the relative angle at which the blade strikes the air. The blade (shown in cross section) is revolving over toward us and downward.

Functions peculiar to the automatic variable pitch are, that the initial or minimum pitch angle (e) governs the thrust, while the greater pitch angle (H) indicates the speed. Example for thrust: Let the propeller rotate on a stationary plane, the blades now strike the air in the line of the plane of rotation, d—d, and let the minimum pitch angle (e) be 15 degrees off this line of strike. Then let the plane be in flight, the blades will now strike the air along the line (g—k) of the resultant force between the force due to the speed of rotation and the force due to the speed of flight, but the pitch angle (e) will be 15° off this line of strike as before. This constant angle (e) is due to the constant excess pressure on the trailing side over the leading side of the blade. Then the power being constant, the atmospheric pressure constant and the reaction of the helical springs (20) nearly constant, so the rotation of the propeller and engine, the angle (e) and thrust become also nearly constant. These facts have been established by tests under varying atmospheric conditions.

In the drawings the figures indicate the parts as follows, and similar characters refer to similar parts within the several views.

15, Figs. 1 and 7, indicates the hub piece of the propeller.

16, Fig. 7, shows a part of the blade with the shank screwed into the steel sleeve, 17, and for illustration the blade is shown with a flat side toward us showing the axial center line, L—L, and a greater area, 160, on the following side of the axial center line than on the leading side.

17, Fig. 7, refers to the steel sleeves holding the shanks of the blades and connect the blades directly with the equalizing gears, 19.

18, Fig. 7, is a ball thrust bearing holding the sleeves, 17, and blades, 16, within the propeller hub.

19, Figs. 1 and 7, are gears on the sleeves, 17, which with the pinion gears, 25 and 26, constitute the equalizing gears.

20, Figs. 1 and 7, refers to torsional springs encircling the sleeves, 17, and having one end hooked on a stud, 21, set in the sleeves and the other end hooked on a stud bolt, 22, set in the hub, 15, of the propeller. These springs counteract on the axial turning movement of the blade, 16, due to the greater air pressure on the excess area of the following side over the leading side of the blade.

22, Figs. 1 and 7, is a stud bolt set in the hub, 15, to which the inner end of the spring, 20, is hooked; this stud penetrates into the slot, 23, in the sleeve, 17, forming a stop to limit the turning movement of the sleeve.

23, Figs. 1 and 7, are stop-slots cut in the sleeves, 17, which with the stud bolts, 22, limit the turning movement of the sleeves and blades.

24, Figs. 1 and 7, refers to small ball bearings easing the turning movement of the sleeves, 17.

25, Figs. 1—6—7—8, is the principal pinion of the equalizing gears.

250, Figs. 1—6—8, is a shoulder bearing taking the thrust of the bevel-gear-pinion, 25.

26, Figs. 1 and 7, is an auxiliary pinion of the equalizing gears, turning freely on the spindle, 29.

27, Figs. 1—4—7, is a cap connected with the propeller hub, 15, limiting the outward sliding movement of the spindle, 29.

28—280, Figs. 1—6 and 9, is a jaw coupling connecting the operating cylinders, 30—31, with the equalizing gears, 25—26—19, one half, 280, of the coupling is cut on the head, 301, of the inner cylinder, 30, and the other half, 28, is cut on hub of the pinion, 25, of the equalizing gears.

29, Figs. 1—4—6—7—8, is a spindle bolt on which the pinions, 25 and 26, are mounted, the inner end of this spindle is screwed firmly into the head, 301, of the inner cylinder, 30, of the operating cylinders, and slides freely through the bore of the pinions, 25 and 26, a space sufficient to allow the jaw coupling, 28—280, to open and close.

Figs. 1 and 6 show the coupling open.

Figs. 7 and 8 show the coupling closed.

Fig. 4 shows the position of the head of the spindle, 290, when the coupling is closed.

30, Figs. 3—5—6 and 7, is the inner cylinder of the operating cylinders having spiral ribs, 300, on the outside of the cylinder cut to fit and slide in corresponding spiral grooves, 300, cut on the inner side of the outer cylinder, 31.

300, Figs. 3—5—6—7, indicates these co-operating spiral ribs and grooves.

301, is the head of the cylinder, 30, shown on Figs. 1—5—6 and 8.

31, Figs. 1—3—5—6—7—8 is the outer cylinder of the operating cylinders having longitudinal ribs, 32, on the outside of the cylinder fitted to slide in corresponding longitudinal grooves, 32, cut on the inside of the shaft.

33, Figs. 3—6 and 8, is a barrel attached to the head of the outer cylinder, 31, and adapted to slide forward and backward within the inner operating cylinder, 30.

34, Figs. 6 and 8, is a stop ring on the outside of the end of the barrel, 33.

35, Figs. 6 and 8, is a stop ring on the inside of the end of the inner operating cylinder, 30. These stops limit the distance the outer cylinder, 31, may be drawn out over the inner cylinder, 30, before the jaw coupling, 28—280, is disengaged.

36, Figs. 1 and 7, is a rod connecting the outer cylinder, 31, with the handwheel, 370, and screw, 37.

370—37, Figs. 1 and 7, shows a hand wheel and screw by which the movements of the operating cylinders, 31—30, and equalizing gears, 25—26—19, may be operated to reduce the pitch of the blades, 16, manually.

38, is a fixed abutment threaded to engage the hand wheel screw, 37.

39, Figs. 1 and 7, is a swivel joint in the rod, 36.

40, is the propeller shaft on Fig. 1, and 400 is both propeller and engine shaft on Fig. 7.

41, is a gear wheel on the propeller shaft, Figs. 1 and 2.

42, Fig. 7, is a piston head connected to the cylinder, 31, and 420 is another piston head connected to the handwheel screw, 37. These piston heads together with the intermediate fluid in the chambers and channels, 43, Fig. 7, operate exactly the same, and with the same effect, as the continuous rod, 36, shown in Fig. 1. Referring to Fig. 7, when the piston head, 420, is driven forward by the hand wheel and screw, 37, the movement is transmitted through the intermediate fluid in the chambers, 43, to the piston head, 42, and operating cylinders, 31 and 30; thus turning the equalizing gears, 25, 26, 19; sleeves and blades, 17—16, against the torsional tension of the springs, 20, and decreasing the pitch angle of the blades accordingly. Then reversing this operation to increase the pitch angle of the blades, the hand wheel screw, 37, is turned back drawing back the piston head, 420, relieving the pressure on the piston head, 42, and cylinder, 31, thus permitting the cylinder, 30, equalizing gears, 25 and 19, with the sleeves and blades, 17 and 16, to turn back under the reacting tension of the springs, 20, and increase the pitch angle of the blades. The backward movement of the piston head, 42, due to the reaction of the springs, is further accelerated by the atmospheric pressure on this head due to the vacuum formed between the piston heads when the head, 420, is drawn back.

44, Fig. 10, is a clamp collar on the shank of the blade, 16, having lugs, 440, and a stop, 46, with a clamp screw, 45, piercing the lugs and stop.

45 is the clamp screw of the collar, 44.

46 is the stop on the collar, 44, tapped to receive the clamp screw, 45.

460 is a lug on the stop, 46, cut to fit a notch, in the shoulders of the sleeves, 17.

47—47, Fig. 2, are gears on the engine shafts, 470, meshing with the gear, 41, on the intervening propeller shaft, 40, and having one half of a clutch coupling cut on each side of each gear.

472, Fig. 2, are clutch plates on the engine shafts having faces adapted to grip and interlock with corresponding faces on the ends of the gears, 47, also having helical ribs and grooves cut in the bore of the hubs of these clutch plates to engage helical ribs and grooves on the engine shafts, 470; so that when one engine shaft is stopped its gear, 47, continues to rotate idly, under the power of the companion shaft, and the clutch plates of this idle gear are thrown out of clutch automatically. The faces of these clutches may have beveled radial ribs, or jaws, to interlock with each other, or circular V shaped ribs and grooves cut concentrically on the faces of the clutch to wedge into each other.

Reference numerals 15 to 26 inclusive, refer to parts of this propeller which are included in my Patent No. 1,250,263, above mentioned. Reference characters 27 to 46 inclusive, refer to parts which are new and in specific combination with the above mentioned original parts.

*Describing the automatic operation of the propeller*

Referring to Fig. 7, it is seen that the blade, 16, has a greater area on the following side, 160, than on the leading side, and when the propeller is rotated the excess pressure of the air on this greater area causes the blade to turn on its axis, L—L, from an obtuse initial angle as shown on diagram G, Fig. 12, to an acute angle as shown on diagram E; but helical springs, 20, attached to the sleeves, 17, on the blades, and to the propeller hub, 15, counteract this turning movement and tend to turn the blades back from the angle shown at E to the initial angle shown at G. The diagram G, shows the blade in normal position when at rest and the spring, 20, under low tension; the diagram E shows the relative blade angle when the propeller is rotating at high speed and the spring is under high tension; between these two positions the blades are held automatically at their most efficient angle at every instant, and under any and all conditions or variations of air currents.

The blades and sleeves are held in the hub-sockets of the propeller against centrifugal force, by the ball thrust bearings, 18, Fig. 7, and turn readily on their axis, L—L, to their most efficient angle at every change of air pressure or air currents. This infallible turning movement constitutes a practical governor controlling and maintaining the proper blade angle and a nearly uniform rotation of the engine and propeller, with a correspondingly uniform thrust until the blade angle exceeds about forty-five degrees.

The equalizing gears, 19, 25, and 26, cause the blades to take equal parts of the total propeller thrust, by holding each blade to the exact angle due to the average pressure of air on all of the blades; for example: the greater air pressure on the blade sweeping against the wind is balanced by the lesser air pressure on the blade sweeping with the wind and the equalizing gears hold the blades to the exact angle due to the average balance of pressure.

*Describing the manual operation to reduce the pitch of the blades*

Referring to Figs. 1 and 7, it will be seen that the blades, 16, of the propeller may be connected through the equalizing gears, 19—25, coupling, 28—280, cylinders, 30—31, and rod, 36, with a hand wheel screw, 37, so the aviator may reduce the pitch of the blades manually.

In operation, let it be desired to reduce the pitch of the blades from a great pitch angle, diagram G, Fig. 12, to a lesser pitch angle, diagram E. The hand wheel screw, Fig. 1, is turned to push the outer cylinder, 31, forward, sliding his cylinder (with its longitudinal exterior ribs 32, in the corresponding longitudinal grooves, 32, in the shaft) over the inner cylinder, then because of the convolving ribs and channels, 300, Figs. 3 and 7, on the adjoining surfaces of the cylinders, the inner cylinder, 30, is first carried forward with the outer cylinder, 31, until the jaws, 280, on the head of this cylinder, 30, lock with the jaws, 28, on the hub of the principal pinion, 25, of the equalizing gears. Further forward movement of the outer cylinder, 31, will then, because of the above described convolving ribs and channels, cause the inner cylinder, 30, to turn laterally, and, through the jaw coupling, 28—280, also turn the pinion, 25, gears, 19, sleeves, 17, and blades, 16, correspondingly. The blades have now been turned from their normal angle, G, Fig. 12, when at rest, to a more acute angle, diagram E, when in rapid rotation, and against the counteracting torsional tension of the springs, 20.

Then reversing the above operation to return the blades back to their normal angle as when at rest; the hand wheel screw, 37, is turned back allowing the torsional tension of the springs, 20, to turn the blades back from their acute angle, diagram E, to the greater angle, diagram G (Fig. 12) and through the equalizing gears, 19—25, and jaw coupling, 28—280, turn the inner cylinder, 30, laterally, and push the outer cylinder, 31, back longitudinally while at the same time pushing the inner cylinder, 30, forward and holding the jaw coupling, 28—280, coupled until the cylinders have reached their limit of telescoping action. When the hand wheel screw, 37, is turned back until the cylinders, 30—31, are withdrawn beyond their telescoping limit then the jaw coupling, 28—280, separates, allowing the pinion, 25, to turn freely on the spindle, 29, and the equalizing gears and blades to operate automatically.

I claim:

1. An automatic variable pitch propeller, comprising a hub, having radial sockets, blades having shanks swiveled one in each socket, each blade having an eccentric area on the following side of its axial center line, by which the rotation of the propeller produces an axial rotative movement of the blade under pressure of the air; and a torsional spring secured to the shank of each blade and to their sockets to counteract such turning movement, with equalizing gears and pinions for conveying the turning movement of one blade to the other, and means in the form of stops for limiting such turning movement; in combination with means for reducing the pitch angle of the blades manually, comprising; a hollow propeller shaft having telescoping cylinders within, adapted to slide longitudinally while rotating with the shaft and means for producing and controlling this sliding movement; also means by which the inner cylinder is caused to turn laterally when the outer cylinder is moved longitudinally, and a coupling connecting the inner cylinder with the equalizing gears and blades of the propeller by which the turning movement of this cylinder is transmitted to the blades, to reduce their pitch angle manually against the counteracting torsional power of the springs.

2. An automatic variable pitch propeller, comprising the combination of a hub, having radial sockets, sleeves secured within the sockets but free to turn on their axis therein, blades secured in the sleeves, said blades having an eccentric and greater area on the rear or following side than on the front or leading side of their axial line, by which they are caused to turn axially under pressure of the air; a torsional spring encircling each sleeve within its socket, one end of which spring is hooked on a stud on the sleeve and the other end hooked on a stud in the socket, which studs and spring react against the axial turning movement of the blades; equalizing gears comprising pinions mounted on a spindle piercing the center of the hub, and gears on the sleeves in mesh with the pinions, by which gears and pinions the axial turning movement of one blade is communicated to the other; and means, by which the turning movement of the sleeves and blades is limited; in combination with means for reducing the pitch angle of the blades manually, comprising a hollow propeller shaft having two cylinders contained therein and adapted to slide longitudinally while rotating with the shaft, one of the said cylinders being within the other and means for producing and controlling the sliding movement of said cylinders; spiral ribs and grooves cut on the inner surface of the said outer cylinder convolving with spiral ribs and grooves on the outside of the inner cylinder, so that by moving the outer cylinder longitudinally, the inner cylinder is caused to turn laterally; and a coupling connecting the said inner cylinder with the equalizing gears of the propeller to transmit the said turning movement to the sleeves and blades, thus operating the blades manually to reduce their pitch.

3. In a propeller having blades with an automatic axial turning movement to vary their pitch angle, means for reducing the angle manually through a tortuous engine shaft, comprising; a shaft having a chamber in each end; a duct connecting the chambers through the crank bearings and a fluid in the duct; also a piston head in each chamber and means for putting pressure on the first piston and transmitting this pressure through the fluid, hydrostatically, to the second piston; also a cylinder connected to this second piston adapted to slide longitudinally while rotating with the shaft, and a second inner cylinder telescoping into the said first outer cylinder and adapted to turn laterally when the outer cylinder is moved longitudinally, with means for connecting said second, inner, cylinder with the equalizing gears and blades, so that through the pistons, fluid, cylinders and equalizing gears, the pitch angle of the blades may be reduced manually.

4. In a propeller with blades having an axial turning movement to vary their pitch angle, means for reducing manually the pitch angle of the blades, comprising a hollow propeller shaft having telescoping cylinders contained within it, adapted to slide longitudinally while rotating with the shaft, and means for producing and controlling this sliding movement, said means comprising spiral ribs and grooves on the adjoining surfaces of the cylinders by which the inner cylinder is caused to turn laterally when the outer cylinder is moved longitudinally.

5. In a propeller having a variable blade angle, a blade having a shank, a sleeve thereon, a clamp collar on the shank of the blade, lugs on the collar, a stop between the lugs, and a clamp screw piercing the lugs and stop, by which screw the collar is clamped on the shank of the blade, and a lug on the stop adapted to engage a notch in the shoulder of the sleeve of the blade to prevent the blade unscrewing from the sleeve, and a second lug on the stop, bearing on the blade, to prevent it from turning on the clamp screw.

In testimony whereof, I have signed my name to this specification, this 21st day of May, 1929.

ROBERT YATES.